(12) United States Patent
Ikegami et al.

(10) Patent No.: US 9,475,321 B2
(45) Date of Patent: Oct. 25, 2016

(54) IMAGE PROCESSING APPARATUS, IMAGE PROCESSING METHOD AND MEDIUM

(71) Applicant: CANON KABUSHIKI KAISHA, Tokyo (JP)

(72) Inventors: Shinsuke Ikegami, Tokyo (JP); Akira Kuronuma, Tokyo (JP); Kenji Kubozono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/806,443

(22) Filed: Jul. 22, 2015

(65) Prior Publication Data
US 2016/0031248 A1 Feb. 4, 2016

(30) Foreign Application Priority Data

Jul. 31, 2014 (JP) ................................. 2014-157086

(51) Int. Cl.
*B41J 29/38* (2006.01)
(52) U.S. Cl.
CPC ..................... *B41J 29/38* (2013.01)
(58) Field of Classification Search
CPC ................................. B41J 29/38; G06K 15/00
USPC ........................................................ 347/19
See application file for complete search history.

(56) References Cited

U.S. PATENT DOCUMENTS

| 2004/0141209 | A1 | 7/2004 | Marumoto |
| 2009/0160125 | A1 | 6/2009 | Fujita |
| 2010/0253982 | A1* | 10/2010 | Kasai .................. B41J 2/2142 358/3.26 |
| 2011/0261417 | A1 | 10/2011 | Akahane |
| 2013/0182052 | A1* | 7/2013 | Matsuzaki ........... B41J 2/17526 347/86 |

FOREIGN PATENT DOCUMENTS

JP 2003-244469 A 8/2003

OTHER PUBLICATIONS

U.S. Appl. No. 14/814,378, filed Jul. 30, 2015 Office Action Dated Oct. 28, 2015.
Office Action for U.S Appl. No. 14/814,378, Mar. 7, 2016.

* cited by examiner

*Primary Examiner* — Jason Uhlenhake
(74) *Attorney, Agent, or Firm* — Canon U.S.A., Inc. IP Division

(57) ABSTRACT

A judgment reference data having a resolution lower than a nozzle resolution in a nozzle arranging direction is generated based on input image data. The judgment reference data and read data acquired by reading a printed image are compared to judge whether the printed image has color unevenness or not.

20 Claims, 13 Drawing Sheets

IMAGE PROCESSING APPARATUS, IMAGE PROCESSING METHOD AND MEDIUM

BACKGROUND OF THE INVENTION

1. Field of the Invention

The present invention relates to an image processing apparatus, an image processing method and a medium storing a program for inspecting a printed material having undergone printing processing performed by a printing apparatus.

2. Description of the Related Art

In the past, in order to inspect an image printed by a printing apparatus, a method has been known which uses read data acquired by reading a printed image to judge the presence/absence of a color misalignment.

Japanese Patent Laid-Open No. 2003-244469 discloses a method for judging occurrence of a color misalignment on an image read with a scanner, for example, based on a color saturation or a color correlation in a monochrome region extracted by using a color saturation of image data in order to detect random color unevenness included in the printed image.

However, the method disclosed in Japanese Patent Laid-Open No. 2003-244469 has a problem that some resolutions subject to the processing for detecting a color misalignment on an image may impose a higher processing load, requiring a time for the color misalignment detection processing.

SUMMARY OF THE INVENTION

The present invention provides an image processing apparatus for inspecting an image printed by using a print head having a plurality of nozzles for discharging ink aligned at first intervals in a first direction and on a printing medium conveyed in a second direction intersecting the first direction, the apparatus including a generating unit configured to generate judgment image data used for inspection of printed image a resolution of whose corresponding image in the first direction is a second resolution lower than a first resolution corresponding to the first interval based on image data, and an inspection unit configured to inspect the image by comparing read data acquired by reading the image printed on the printing medium based on the image data with the judgment image data.

Further features of the present invention will become apparent from the following description of exemplary embodiments with reference to the attached drawings.

DESCRIPTION OF THE EMBODIMENTS

First Embodiment

Inkjet Printing Apparatus and Imaging Sensor

Figure 1A:
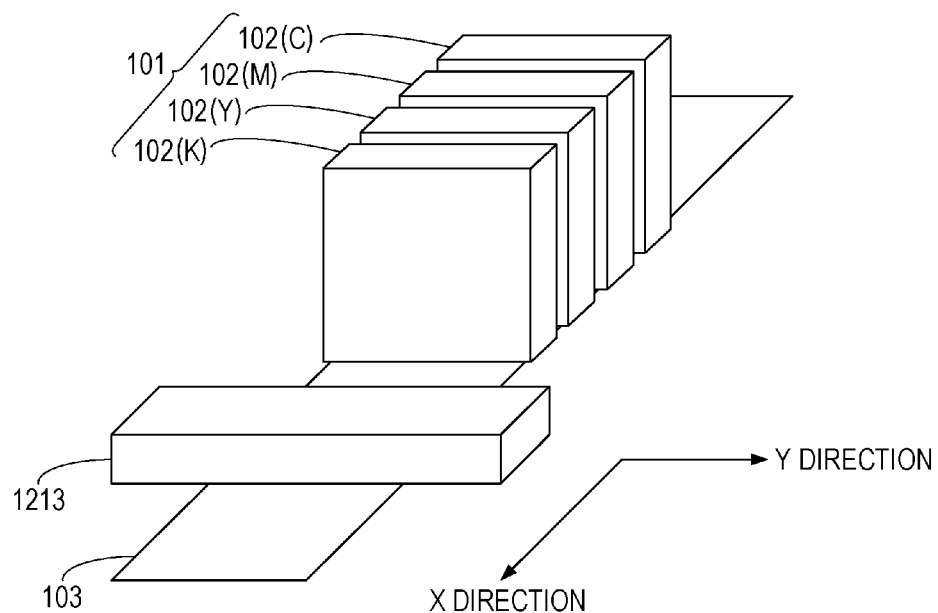
FIGS. 1A and 1B are schematic views illustrating print heads, an imaging sensor, and a printing medium.
Figure 1B:
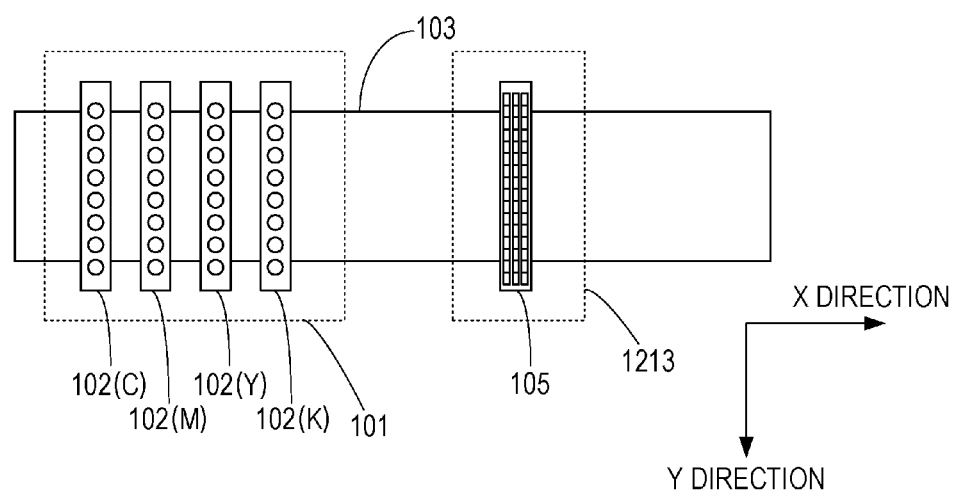

FIGS. 1A and 1B are schematic views illustrating a plurality of print heads 102 in a printing unit 101, an image reading unit 1213, and a printing medium 103. FIG. 1A includes perspective views of the print heads 102, the printing medium 103 and the image reading unit 1213, and FIG. 1B is a plan view from the discharge port surface side having nozzles (discharge ports) of the print heads 102.

According to this embodiment, an ink jet printer will be described in which ink is discharged from nozzles provided in the print heads to print an image. A printer according to this embodiment uses rolled continuous forms as a printing medium. The printer is a high speed line printer capable of one-side printing and double-side printing and may be usable in fields where a large amount of data are printed as in a print laboratory.

The printing unit 101 is configured to form an image on the printing medium 103 by using the print heads 102. The print heads 102 have a nozzle array having a plurality of nozzles aligned in the illustrated Y direction. Ink droplets are discharged from the nozzles so that an image may be printed on a printing medium conveyed in the illustrated X direction perpendicular to the illustrated Y direction. The print heads 102 are capable of printing an image on a printing medium having a maximum width in the Y direction conveyed once among supported printing media. According to this embodiment, the printing unit 101 is capable of discharging inks of a plurality of colors. A plurality of print heads 102 corresponding to the ink colors are aligned in the illustrated X direction. The print heads 102 include a cyan ink print head 102(C), a magenta ink print head 102(M), a yellow ink print head 102(Y), and a black ink print head 102(K). According to this embodiment, a what-is-called thermal inkjet type is adopted in which a heating element is used as a printing element and is caused to generate heat to discharge ink.

The number of ink colors is not limited to the four colors of cyan, magenta, yellow, and black, and the number of print heads is not limited to four. The printing method to which the present invention is applicable is not limited to the aforementioned thermal type but may be any one of a type using a piezoelectric element, a type using an electrostatic element, and a type using a MEMS element.

The image reading unit 1213 is configured to optically read an image or an inspection pattern printed with the print heads 102 on the printing medium 103 by using a sensor 105 such as a scanner and a camera. This configuration allows inspection of a discharge state, a conveyance state of a printing medium, an image position and so on of each of the nozzles of the print heads 102.

Figure 2:
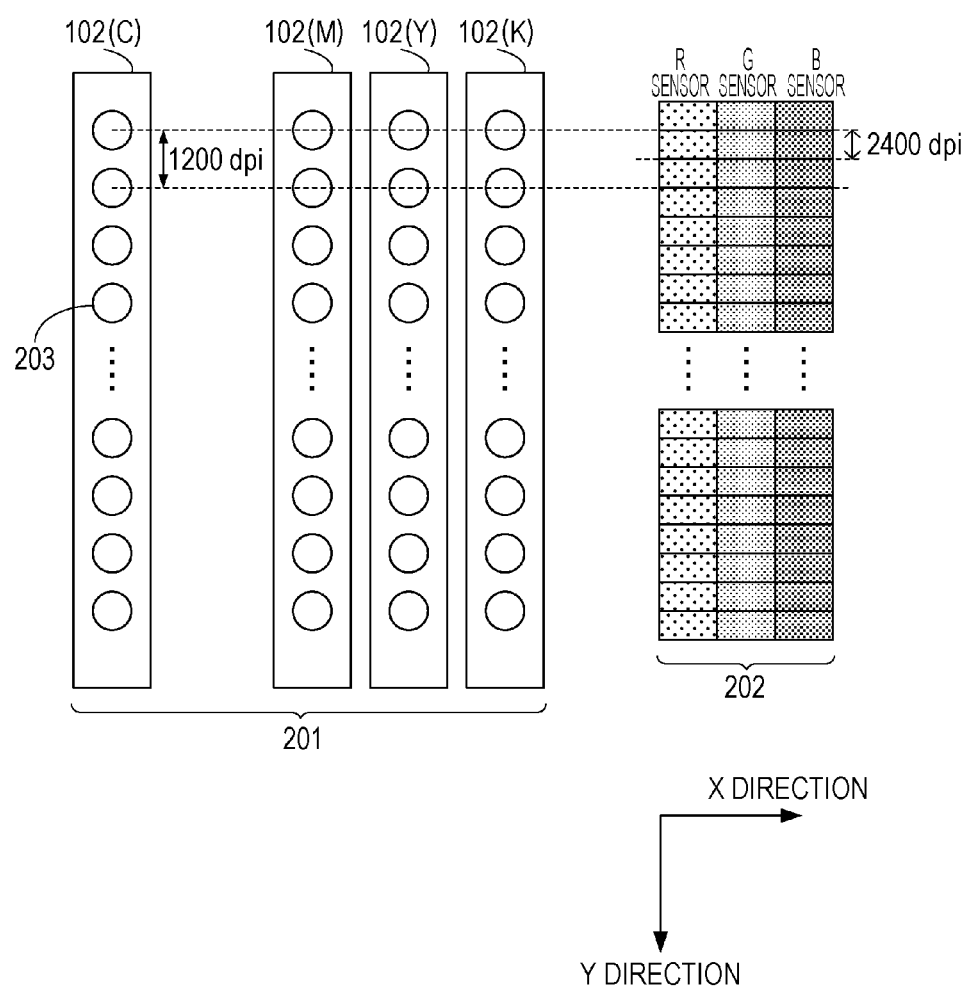
FIG. 2 illustrates a nozzle arrangement of a print head and an arrangement of photodiodes of a sensor.

FIG. 2 is a diagram for explaining a correspondence between the nozzles of the print heads 102 aligned as in FIG.

1B and the sensor 105. FIG. 2 illustrates an arrangement 201 of nozzles of the print heads 102 in which the nozzles are aligned in a predetermined interval. The nozzles 203 are aligned in the Y direction with a nozzle resolution corresponding to 1200 dpi such that 1200 nozzles may be aligned per one inch, that is, one nozzle may be provided to one dot. An arrangement 202 includes the sensors 105. From the Nyquist theorem, in order to sample one signal, the double of the sampling resolution is required. Therefore, for processing nozzle by nozzle, 2400 photodiodes per inch are required as reading pixels for each of RGB. In other words, nozzles are required to be arranged at intervals each corresponding to 2400 dpi. Therefore, according to this embodiment, the sensors 105 are used in which photodiodes are arranged at intervals of 2400 dpi along the Y direction in which the nozzles are aligned. Each of the sensors 105 is capable of reading an image and an inspection pattern printed on a printing medium at a resolution of 2400 dpi or lower.

System Configuration

Figure 13:
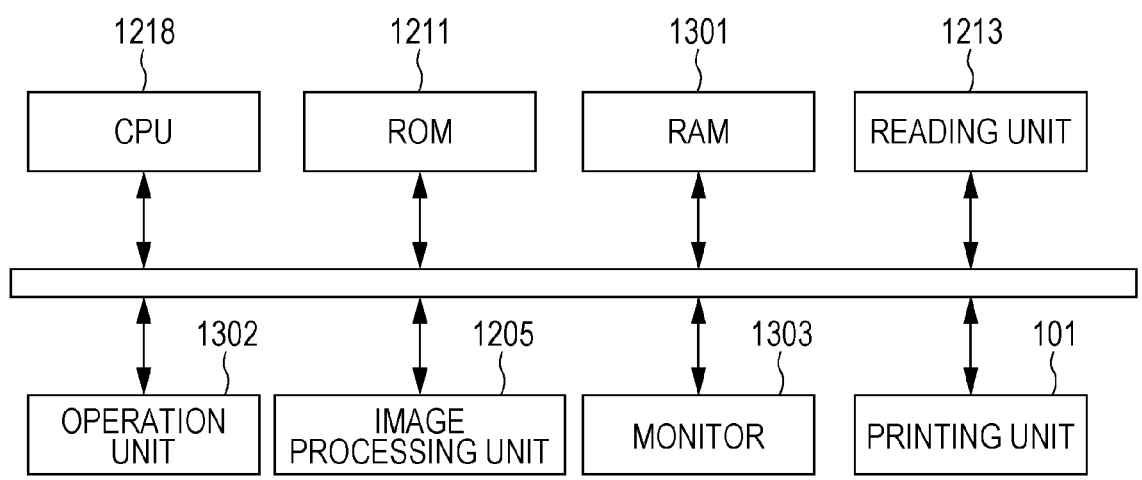
FIG. 13 is a diagram for explaining a system configuration.

FIG. 13 is a block diagram illustrating a configuration of an image processing apparatus according to this embodiment. The image processing apparatus of this embodiment is implemented by a program executed by a host computer. A CPU 1218 executes controls over a RAM 1301, an operation unit 1302, an image processing unit 1205, a monitor 1303, a reading unit 1213, and the printing unit 101 in accordance with information data and corresponding programs stored in a ROM 1211. The programs stored in the ROM 1211 may include a control program, an OS (operating system), an application program, a color conversion processing module, and a device driver. The information storage unit 1205 is a storage unit including a hard disk and a nonvolatile memory to and from which information and data, which will be described below, are to be stored and read. The reading unit 1213 is configured to process a signal read by the sensor 105. The RAM 1211 is usable as a working area and a temporary save area for data input from the control programs and the operation unit 1302 when the CPU 1218 operates, and a DRAM 1204, which will be described below, is also included in the RAM 1211.

Figure 12:
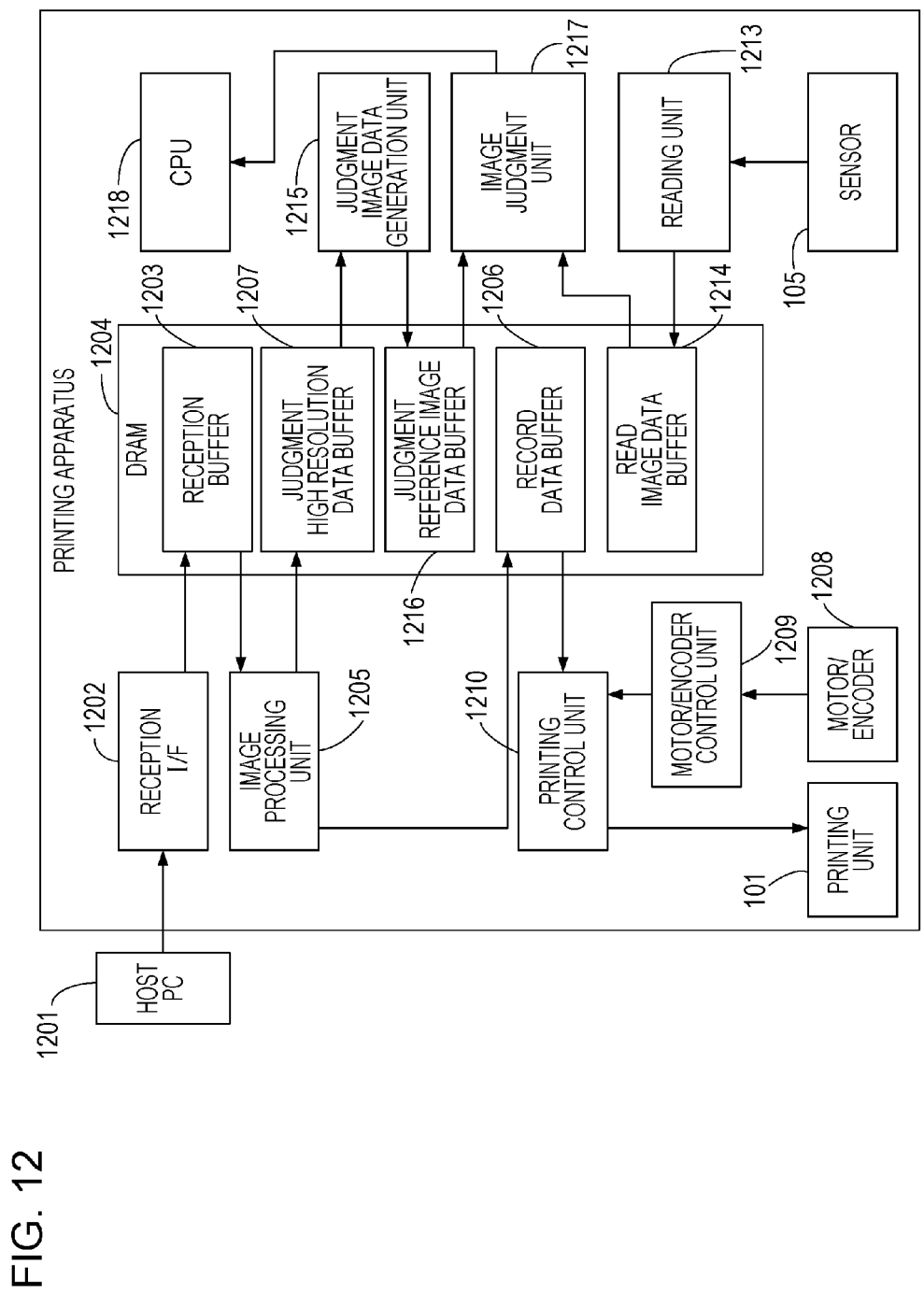
FIG. 12 is a diagram for explaining an entire system configuration.

FIG. 12 is a diagram for explaining the entire system configuration and a control flow according to this embodiment. The control flow of this embodiment is implemented by a program stored in the ROM 1211 and read and executed by the CPU 1218. The image processing in this case will be described in detail with reference to FIG. 6. A reception buffer 1203 in the printing apparatus body receives input image data to be printed from a host PC 1201 through a reception I/F 1202. The image processing unit 1205 reads out input image data from the reception buffer 1203 and performs a quantization process in step 603, which will be described below, in FIG. 6. The quantized image data are stored in a print data buffer 1206. The image processing unit 1205 generates high resolution image data for judgment in parallel with image processing on input image data and stores the data in a buffer 1207 for high resolution image data for judgment (hereinafter, simply called a data buffer 1207).

A judgment image data generating unit 1215 reads out high-resolution image data for judgment from the data buffer 1207, performs a resolution reduction process thereon, and generates judgment reference image data. Judgment reference image data is generated which, in the Y direction in which nozzles are aligned, have a resolution lower than the nozzle resolution, which will be described in detail below. The generated judgment reference image data are stored in a buffer 1216 for judgment reference image data (hereinafter, called a data buffer 1216). A printing control unit 1210 generates print data describing ink discharge or non-discharge based on a print timing signal input from a motor encoder 1208 and generated by a motor encoder control unit 1209. The print data are sent to the printing unit 101, and an image is printed on a printing medium.

A reading unit 1213 processes a sensor signal acquired by reading a printed image with the sensor 105, and the result is stored in a read image data buffer 1214 as a read data. An image judgment unit 1217 reads and compares judgment reference image data stored in the data buffer 1216 and a read data stored in the read image data buffer 1214. Based on the comparison result, whether the printed images have color unevenness or not is judged. The judgment result is then sent to the CPU 1218.

The reception buffer 1203, data buffer 1207, data buffer 1216, print data buffer 1206, and read image data buffer 1214 are included in a main memory such as the DRAM 1204 of this system. However, the main memory does not have to be a DRAM but may be any memory such as an SRAM excluding a DRAM as long as it belongs to the scope of the definition of a RAM.

Head Shading Process

Figure 3:
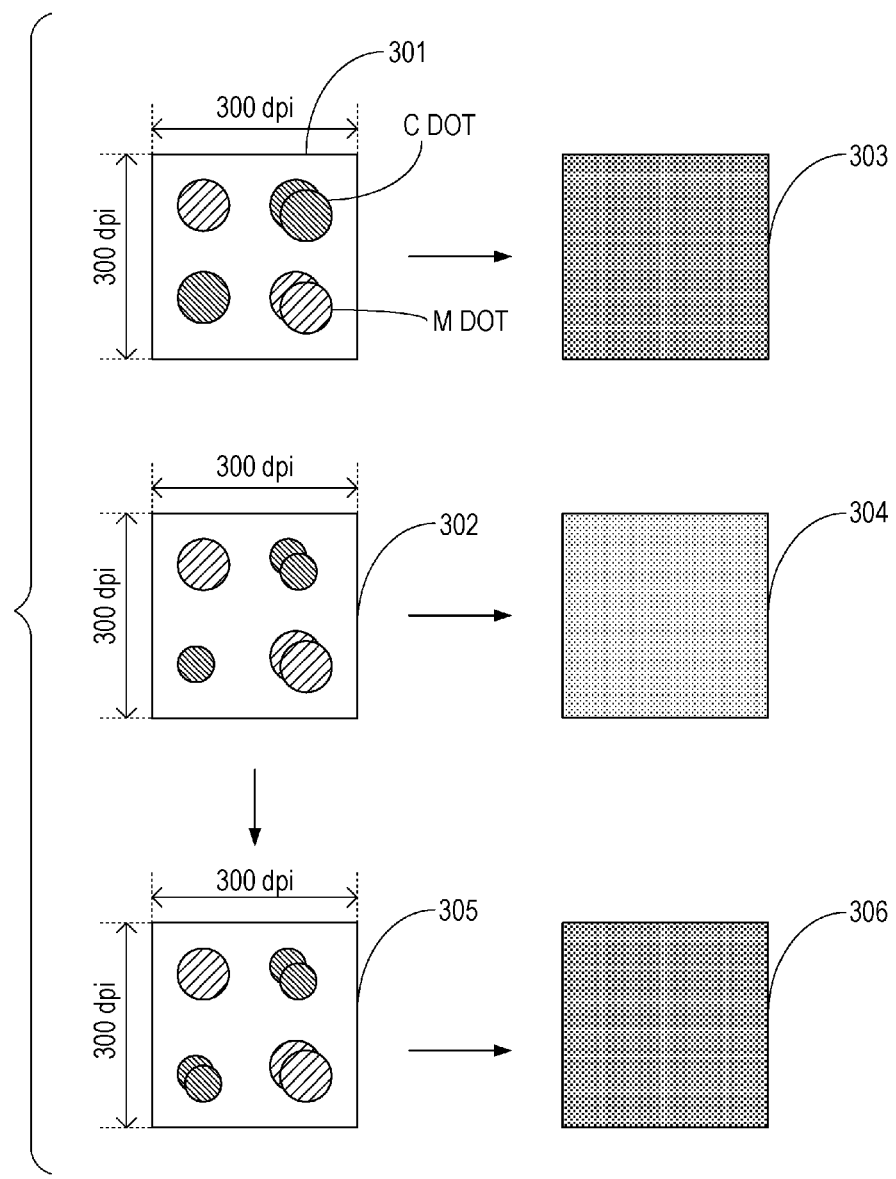
FIG. 3 is a diagram for explaining a concept of head shading.
Figure 4:
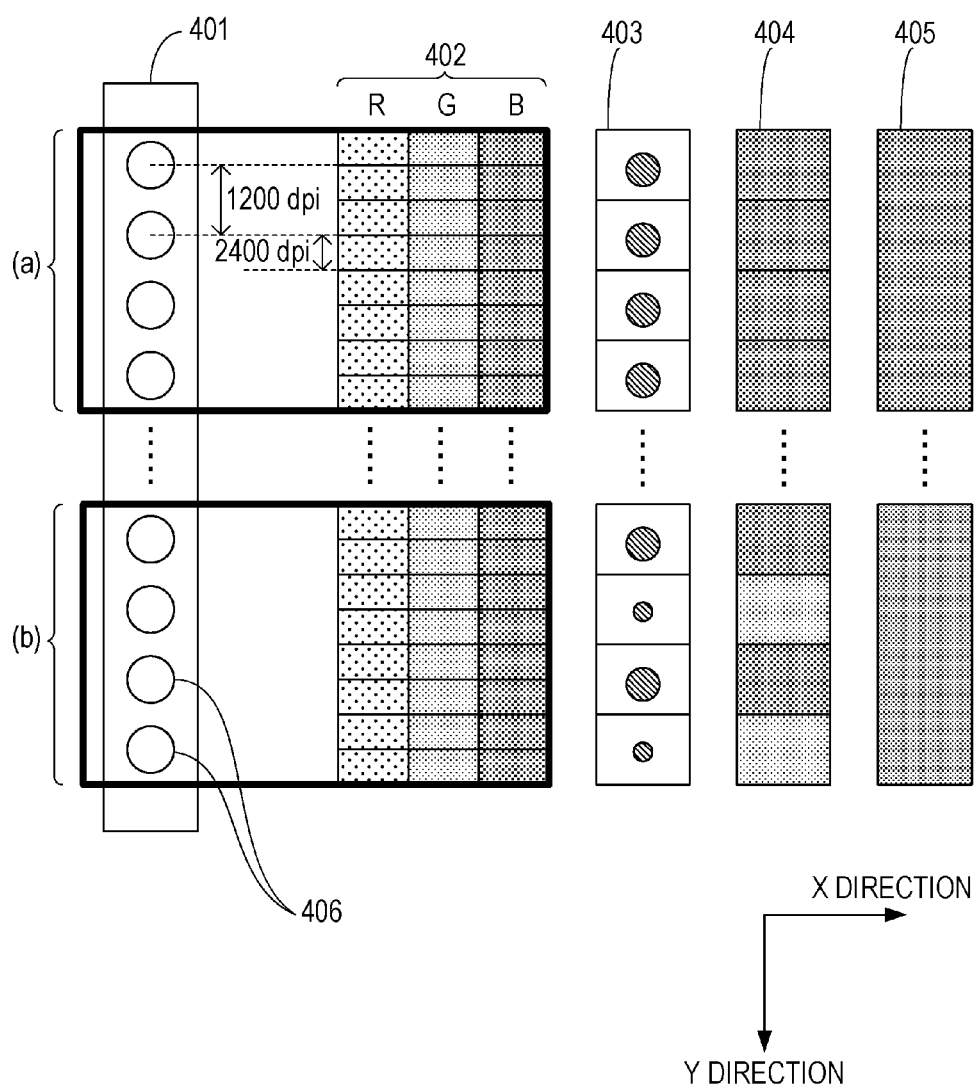
FIG. 4 is a diagram for explaining a correction unit in head shading.

FIG. 3 and FIG. 4 are diagrams for explaining a concept of a head shading process (HS process). With reference to FIG. 3, a case where a blue image is to be printed will be described. It is assumed that a reference dot arrangement 301 includes three cyan (C) dots and three magenta (M) dots within a unit region of 300 dpi×300 dpi. A blue image 303 is printed with a reference number of cyan dots and a reference number of magenta dots. On the other hand, nozzles provided in the print heads 102 have variations in manufacturing processes, which cause variations in amounts of discharged ink droplet. In a case where the discharge amount from a cyan nozzle is less than the reference amount, as in a dot arrangement 302, for example, applying ink droplets corresponding to three dots may result in a lower amount of C ink in a unit region as in the dot arrangement 301. As a result, the printed image 304 is colored in reddish blue which is different in color from the blue image 303 printed with the reference amount. Such variations in discharge amount may cause color differences between unit regions aligned in the nozzle arranging direction on an image printed on a printing medium even with uniform even from an input image data with equal values, resulting in continuous stripes of uneven colors in the direction of conveyance of a printing medium.

In order to correct color differences due to such variations in discharge amount, a correction process may be performed on image data to be printed in an HS processing unit 707, which will be described below. Here, the number of cyan dots is adjusted from 3 dots to 4 dots as in a dot arrangement 305 in FIG. 3. Thus, the color of the image 306 printed based on the image data having undergone the head shading correction may be matched with the color of the image 303 printed with the reference number of dots. Performing such a correction process including adjustment of the number of dots of a plurality of unit regions may reduce the color differences between the unit regions.

Next, processing for generating a correction parameter to be used in a correction process will be described with reference to FIG. 4. First, a maintenance pattern for measuring a discharge amount is printed by using a print head 401. The pattern is printed by using nozzles in parts (a) and (b) and other plurality of different parts of a nozzle array of nozzles 406 of the print head 401. The pattern is a monochrome pattern printed in each ink color of C, M, Y, and K. Those patterns are read by using RGB photodiode sensors in a sensor 402 so that the reading results are acquired. The printed pattern has a dot state 403. The four dots in the pattern printed by using the part (a) of the nozzle array have a uniform size while the dots in the pattern printed with the part (b) vary in size. The read data acquired here provide information on density 404 corresponding to the nozzles. Based on the read data, a correction parameter is generated which designates an increase or decrease of the discharge amount for printing an image next.

Such a correction parameter may be prepared for each one nozzle unit, but a correction parameter is generally prepared for a plurality of nozzle units. This is because correction for each one nozzle unit may not be necessary for reproducing the original tint sufficiently during image formation processing in consideration of the size of uneven color visually recognizable by human eyes and the processing load for correcting it while printers in recent years have nozzles arranged at a resolution as high as 1200 dpi, for example. Therefore, for correction processing to be performed on image data to be printed, an optimum resolution enough for acquiring visually unrecognizable color unevenness may be selected so that the processing load may be reduced and the processing speed may be increased. According to this embodiment, a correction table is generated for every 300 dpi or for every four nozzles and is fed back to image data. For that, as illustrated in FIG. 4, information on density is averaged for each of the parts (a) and (b) of the nozzle array, and read data, which is referred by 405, corresponding to 300 dpi is generated. Based on the read data, a correction is performed. By using the correction parameter changed in real time, a head shading process may be performed for each unit of a plurality of nozzles so that color unevenness of a printed image may be reduced and output in a stable manner.

Features and Configurations of this Embodiment

Performing a head shading process as described above may reduce color unevenness due to variations in discharge amount from nozzles. However, even after the head shading process is performed, the discharge amount may possibly vary when continuous printing is performed as in a case where images are printed on rolled continuous forms as a printing medium.

Figure 5:
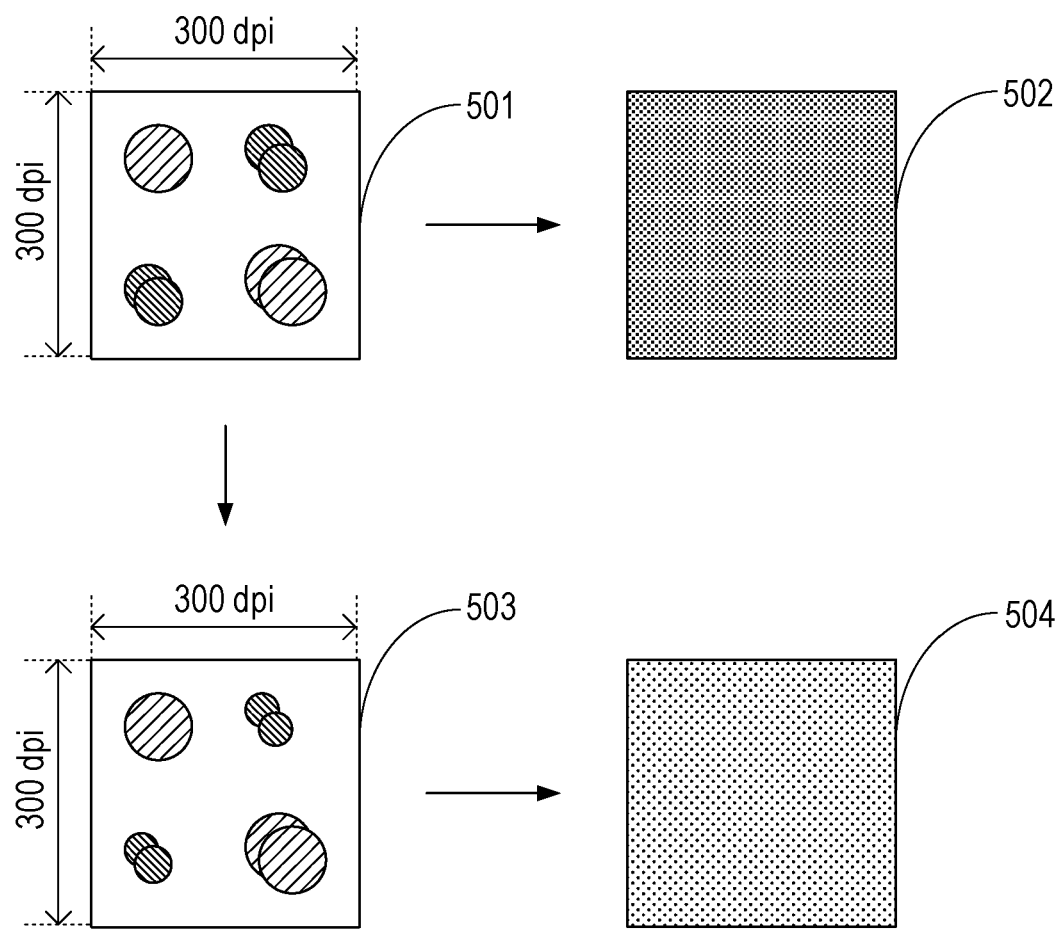
FIG. 5 is a diagram for explaining changes in discharge amount after a head shading process.

FIG. 5 is a schematic diagram illustrating changes in discharge amount due to continuous printing. A dot arrangement 501 is acquired after a head shading process, and an image 502 exhibits color printed with the dot arrangement 501. Immediately after a head shading process is performed, printing in the color matched with the color of an image printed with a reference number of dots. However, performing continuous printing results in reduction of the discharge amount of C dots as in a dot arrangement 503. Then, the amount of C ink applied to a unit region decreases, and the printed image 504 exhibits reddish blue, causing color unevenness again.

According to this embodiment, based on image data to be printed on a printing medium, judgment reference image data is generated which has a lower resolution in the direction (Y direction in FIG. 5) where nozzles are aligned than each of intervals at which nozzles are aligned (hereinafter, called a nozzle resolution). Then, the sensor 105 compares read data acquired by reading an image printed on the printing medium and judgment reference image data to determine whether color unevenness exists or not. This configuration does not require stop of a printing apparatus for recording and measurement of a pattern and thus allows high speed inspection of a printed image without reducing the accuracy of detection by reading an actual image printed on continuous forms.

According to this embodiment, the resolution in the Y direction of the judgment reference image data is 300 dpi while the nozzle resolution is 1200 dpi. With the resolution in the Y direction of the judgment reference image data, color unevenness is not visually recognizable by human eyes. The resolution is matched with 300 dpi which is a correction unit for the head shading process.

Figure 6:
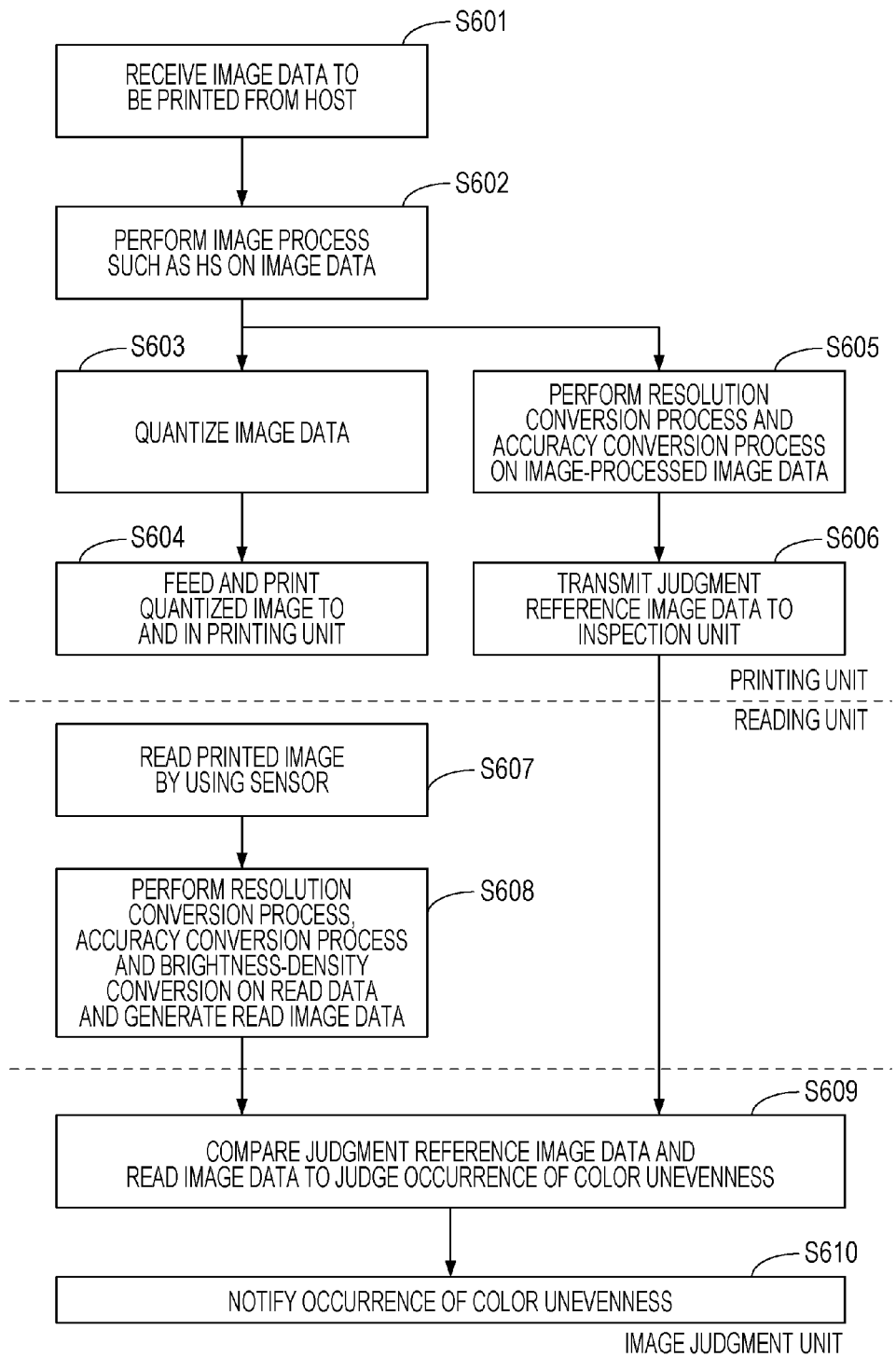
FIG. 6 is an overall flowchart.

FIG. 6 is a flowchart according to a general control program according to this embodiment. This control program is stored in the ROM 1211 and is read and executed by the CPU 1218. In step S601, a printing apparatus receives input image data from the host PC 1201. In step S602, a prestored correction parameter is used to perform image processing on input image data. In step S603, a quantization process is performed on the image processed data. The processing in step S602 and step S603 will be described below with reference to FIG. 7. In step S604, the quantized image data are transmitted to the printing unit 101, and ink dots are discharged in accordance with the conveyance speed of a printing medium. Thus, the image is printed on the printing medium.

On the other hand, in parallel with the flow from step S602 to step S603, judgment reference image data are generated in step S605. Based on the image processed image data, a resolution conversion (averaging) and an accuracy conversion are performed to generate a judgment reference image data. These processes will be described below with reference to FIG. 8 and FIGS. 9A to 9C. In step S606, the generated judgment reference image data are transmitted to the image judgment unit. The processing for generating the judgment reference image data is not required to be performed in parallel and simultaneously with the image processing performed on input image data, and either one may be performed first.

In step S607, the reading unit 1213 reads the image printed on the printing medium at a time point when the printing medium passes through the sensor 105. According to this embodiment, the reading resolution of the sensor 105 for reading an image in Y direction is lower than the printing resolution of an image or the nozzle resolution. In step S608, the read data undergoes a resolution conversion process (averaging process), an accuracy conversion process, and a brightness density conversion process so that read image data are generated. Then, the read image data are transmitted to the image judgment unit.

In step S609, the image judgment unit 1217 receives the judgment reference image data and the read image data and compares the two image data to inspect the printed image to judge occurrence of color unevenness. In step S610, the judgment result is notified to the CPU 1218. This processing flow may be executed in images, lines and rectangles printed rolled continuous forms to allow detection and notification of color unevenness occurring while a plurality of images are being printed continuously.

Image Processes on Input Image Data

Figure 7:
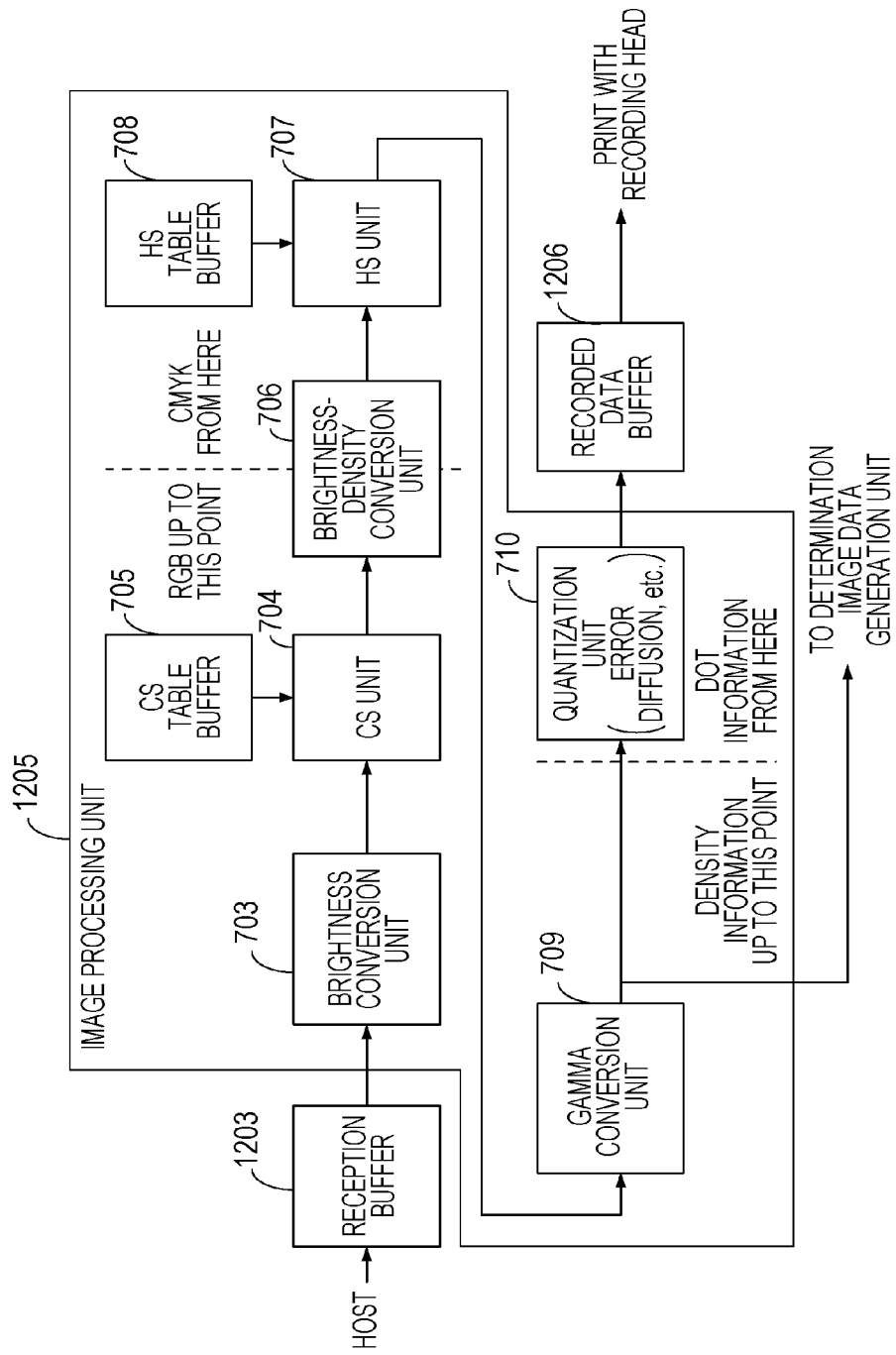
FIG. 7 is a diagram for explaining a dataflow to be performed in a printing unit.

FIG. 7 is a diagram for explaining the image processing, especially processing in step S602, step S603, and step S604, described with reference to the flowchart in FIG. 6 and FIG. 12. First, input image data are received from the host PC 1201 to the reception buffer 1203. The input image data received to the reception buffer 1203 may have any of variable formats such as JPEG and PDF. According to this embodiment, after data in one of such formats are decompressed, RGB data containing three elements of R, G, and B are received as an input image. The input image data have a resolution of 1200 dpi in the X direction and a resolution of 1200 dpi in the Y direction.

The image processing unit 1205 reads out the RGB input image data from the reception buffer 1203, and a brightness conversion unit 703 performs a color space conversion which converts the RGB data to RGB data corresponding to a color space of the printer. Next, the CS unit 704 reads out a correction parameter from a color shading table buffer 705 and performs a color shading process which corrects the image so as not to have color unevenness. The color shading process is a method for performing a correction process in three-dimensional space of RGB so as to prevent color unevenness due to a change in tint of secondary color as a result of an increase or decrease of the discharge amount by a head shading process. Like the head shading process, a plurality of nozzles in the Y direction where the nozzles are aligned are handled as a processing unit, and a correction parameter is prepared for each processing unit. The number of nozzles in the processing unit may be equal to or be different from the number of nozzles in the head shading process.

The image data having undergone the color shading process are converted in a brightness-density conversion unit 706 from the RGB data to data corresponding to the ink color used for printing the image. According to this embodiment, because four C, M, Y, and K color inks are used, the RGB data are converted to CMYK data including four elements of C, M, Y, and K. The HS processing unit 707 reads out a correction parameter from a head shading table buffer 708 and performs a head shading process. The head shading process is performed for each ink color and applies a correction parameter for every plurality of nozzles as described above.

A gamma conversion unit 709 then performs a gamma conversion. Next, a quantization unit 710 performs a quantization process which converts CMYK density data to data describing the number of ink dots for printing. Then, the quantized data are stored in the print data buffer 1206. The generated quantized data have a resolution of 1200 dpi in the X direction and a resolution of 1200 dpi in the Y direction. In synchronization with a print timing signal, not illustrated, index data describing printing or non-printing of ink dots based on the quantized data and the decompressed data are read out from the print data buffer 1206, are transmitted to the printing unit 101 where the image is printed. As a result, the printing resolution for the printed image is equal to 1200 dpi in the X direction where a printing medium is conveyed and 1200 dpi in the Y direction where the nozzles are aligned. The printing resolution in the Y direction is equal to the nozzle array density of the print head.

Process for Generating Judgment Reference Image Data

Figure 8:
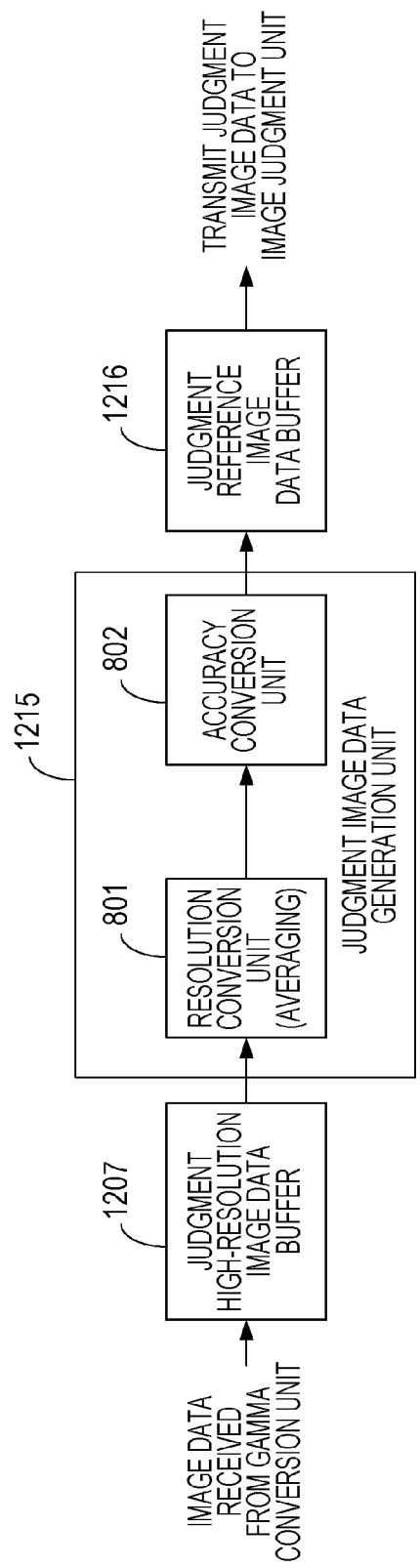
FIG. 8 is a diagram for explaining a dataflow for image data generation for image judgment.

Next, with reference to FIG. 8, a process for generating judgment reference image data, especially processing in step S605 and step S606 will be described in detail. In parallel with data processing on an image to be printed, the image processing unit 1205 transmits image data after the processing in the gamma conversion unit 709 and before the quantization process and immediately before RGB input image data are converted to the number-of-dots to the judgment image data generating unit 1215. The image data after the processing in the gamma conversion unit 709 contains final information on density after the image processing is performed and has a resolution of 1200 dpi in the X direction and 1200 dpi in the Y direction. The judgment image data generating unit 1215 includes a resolution conversion unit 801 and an accuracy conversion unit 802.

First, image-processed image data are received from the gamma conversion unit 709 and are stored in the data buffer 1207. The data buffer 1207 is not always required if the order of image data transmitted from the gamma conversion unit is matched with the arrangement order in the nozzle arranging direction (Y direction) of pixels on the printed image. When the arrangement order of image data is in the X direction, it is required to store the data in the buffer and performs processing for rearranging the image data in the Y direction, for example, when the image data are read out. Here, data are received once by the data buffer 1207.

The judgment image data generating unit 1215 reads out image data from the data buffer 1207 in the arrangement order necessary for a process in the resolution conversion unit 801 and performed a resolution reduction process. According to this embodiment, the resolution in the nozzle arranging direction (Y direction) is converted from 1200 dpi to 300 dpi. This corresponds to the processing unit (300 dpi) in the head shading process. Having described according to this embodiment that a resolution reduction process is performed only in the Y direction, the resolution in the X direction which is a conveying direction of a printing medium may be reduced like the nozzle arranging direction to increase the processing speed.

Next, the accuracy conversion unit 802 performs a process for reducing bit accuracy of image data to accuracy with which color unevenness is detectable. Though the image data transmitted from the host PC are data of RGB each of which corresponds to 8 bits (256 gray scale), the number of gray scale levels is reduced to 6 bit (64 gray scale). This allows reduction of the processing load caused by comparison between judgment reference image data and a read data and reduction of the used memory band and the involved data amount.

The judgment reference image data generated by the processing performed in the resolution conversion unit 801 and accuracy conversion unit 802 are stored in the judgment reference image data buffer 1216. The judgment reference image data buffer 1216 is not always required for the same reason as that for the data buffer 1207. Judgment reference image data are required to be stored once in the judgment reference image data buffer 1216 if the arrangement order of the image data is different from the pixel order defined by the image judgment unit. After that, the judgment reference image data are transmitted to the image judgment unit 1217.

Figure 9A:
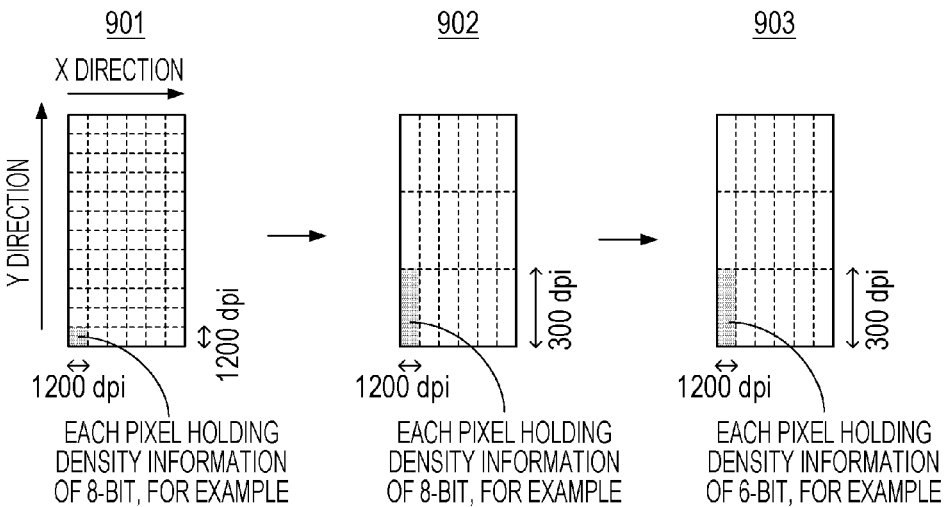
FIGS. 9A to 9C are diagrams for explaining a method for generating image data for image judgment.

FIG. 9A is a schematic diagram illustrating a method for generating judgment reference image data. An image data 901 received from the gamma conversion unit 709 has a series of pixels in the Y direction, and the pixels are aligned in order from the last pixel in the Y direction→the first pixel in the next Y direction in the X direction . . . . The image data has a resolution of 1200 dpi in the Y direction and a resolution of 1200 dpi in the X direction, and each of the pixels corresponds to 8-bit, 256 gray scale CMYK data. The resolution conversion unit 801 adds data for four pixels to the image data in the Y direction and averages the resulting data to perform the resolution reduction process. As a result, 8-bit pixel data 902 are generated having a resolution of 300 dpi in the Y direction and a resolution of 1200 dpi in the X direction. The accuracy conversion unit 802 performs accuracy conversion on the 8-bit pixel data 902 of each pixel to 6-bit data so that judgment reference image data 903 may be generated.

Figure 9B:
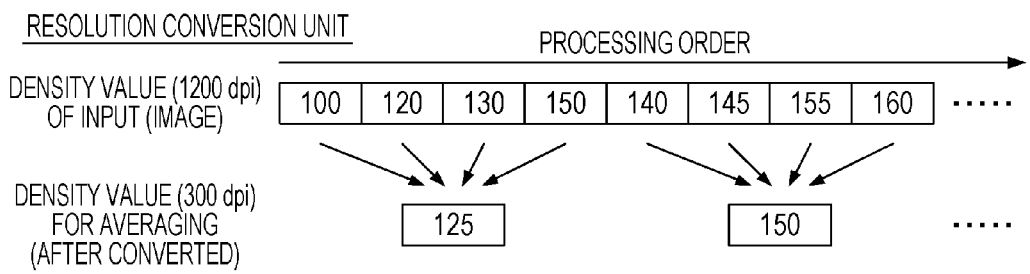

FIG. 9B illustrates a resolution conversion process in the resolution conversion unit 801. The resolution conversion unit 801 receives data that are in the Y direction sequentially in units of four pixels and averages four density values 100, 120, 130 and 150 of information on density of four pixels to acquire a density value of 125. Averaging the density values 140, 145, 155, 160, 150 of information on density for the next four pixels results in a density value of 150. By calculating such average values, information on density for every 300 dpi may be acquired.

Figure 9C:
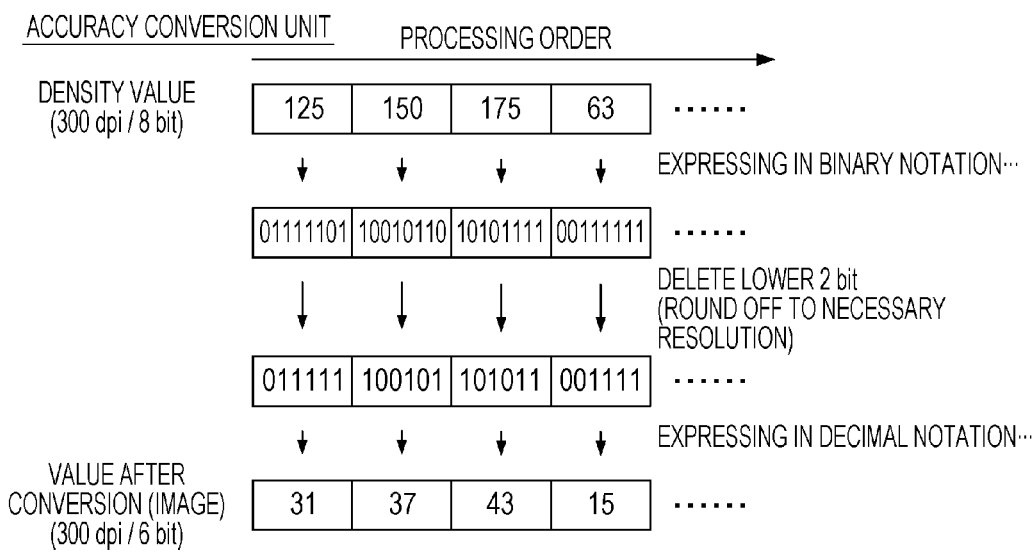

FIG. 9C illustrates a conversion process in the accuracy conversion unit 802. The accuracy conversion unit 802 receives 300 dpi pixel data after the resolution conversion and deletes lower 2 bits of 8-bit pixel data of information on density of 125, 150, 175, and 63. As a result, the pixel data are converted to 300 dpi/6-bit information on density of 31, 37, 43, and 15.

Process in Reading Unit

Figure 10:
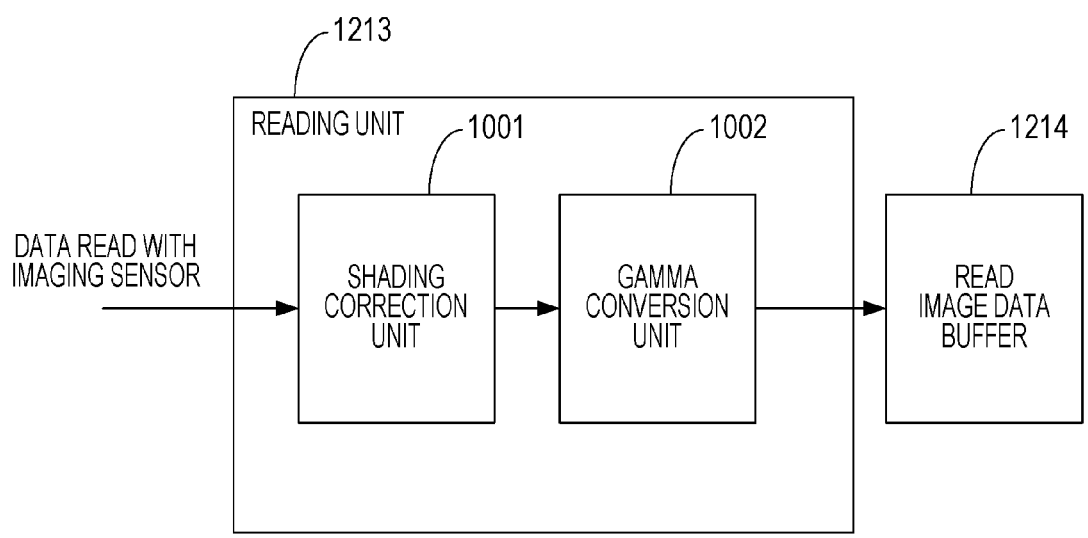
FIG. 10 is a diagram for explaining a dataflow to be performed in a reading unit.

FIG. 10 is a diagram for expressing processing in the reading unit 1213. The reading unit 1213 receives data read by the sensor 105 in accordance with the conveying speed of a printing medium having image data printed thereon. A shading correction unit 1001 corrects a brightness unevenness due to an imaging-related characteristic to acquire an image having even brightness. Next, a gamma conversion unit 1002 corrects the color space of the sensor 105 to be matched with the color space of the printer. Then, the corrected RGB read data are stored in the read image data buffer 1214.

Judgment Reference Image and Judgment Process on Read Image

Figure 11:
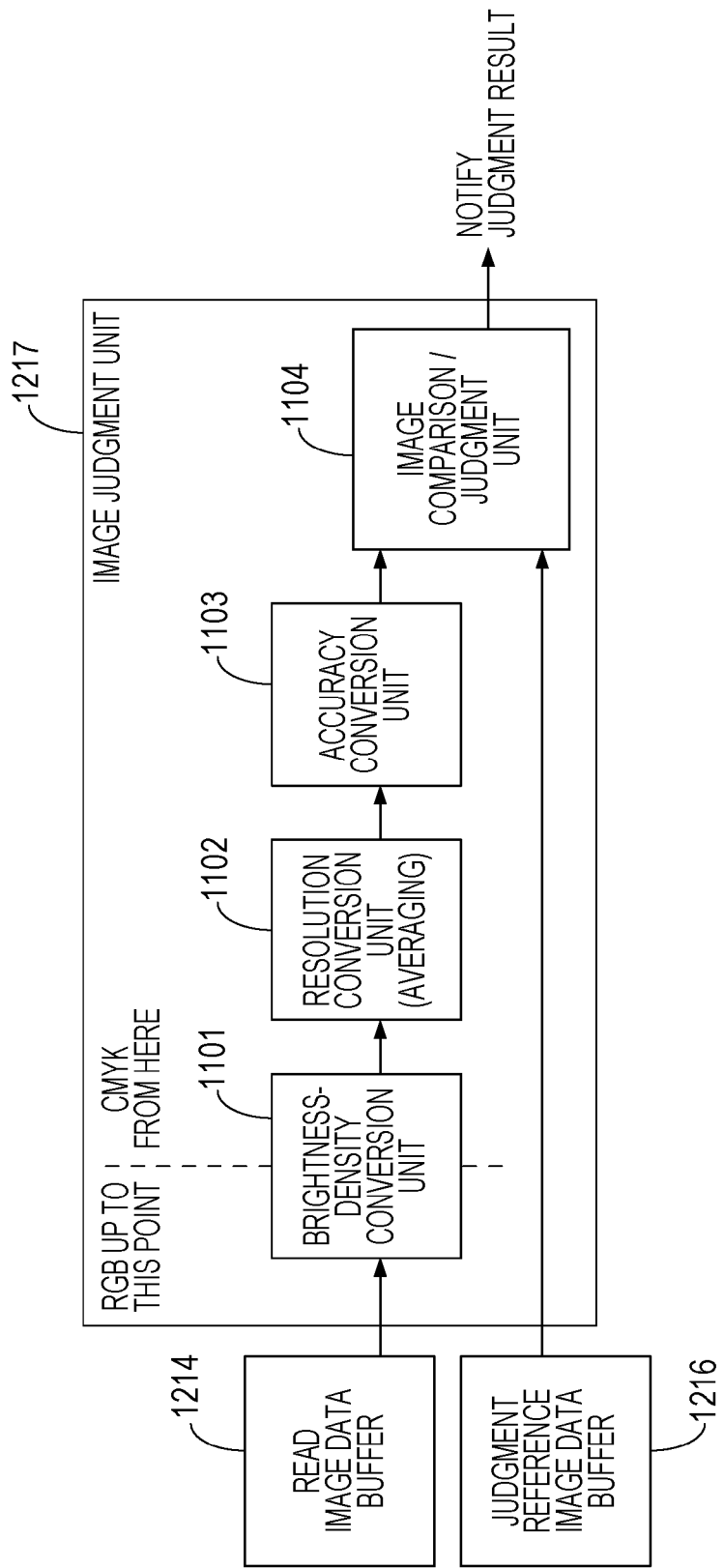
FIG. 11 is a diagram for explaining a dataflow to be performed in an image judgment unit.

FIG. 11 is a diagram for explaining processing in the image judgment unit 1217. A read data acquired by the sensor 105 and having undergone a process in the reading unit 1213 is stored in the read image data buffer 1214. Judgment reference image data generated in the judgment image data generating unit 1215 are stored in the judgment image data buffer 1216. The read data stored in the read image data buffer 1214 are RGB data, and the judgment reference image data stored in the judgment image data buffer 1216 are CMYK data and are therefore required to have an identical image format. Accordingly, the read data are converted to CMYK data in a brightness-density conversion unit 1101 in the image judgment unit 1217 and are then undergo a resolution conversion process in the resolution conversion unit 1102 and an accuracy conversion process in the accuracy conversion unit 1103 in the same manner as the processes described with reference to the FIG. 8 and FIGS. 9A to 9C. Then, image comparison/judgment unit 1104 compares the judgment reference image data and read image data having undergone a conversion process and judges whether the read image data have color unevenness or not. The judgment result is transmitted to the CPU 1218 which generally control the system in the printing apparatus body. Thus, the CPU 1218 is capable of performing control based on the inspection result from a printed actual image, including stopping a printing operation if the occurrence of color unevenness is judged or continuing printing by changing the correction parameter to be used for a correction process. Information indicating an image which may possibly has color unevenness may be notified to a user by using a notification unit, not illustrated, or information prompting a correction parameter regeneration process may be notified. If printing is determined to be continued, the correction parameter is changed based on a result of comparison between judgment reference image data and a read data. Then, the changed correction parameter is used to perform the correction processing on an image printed after the read actual image.

The method for comparing read image data with judgment reference image data in the image comparison/judgment unit 1104 and the method for judging the presence/absence of color unevenness based on the comparison result will be described below with reference to an example. A difference between a pixel value of a pixel of interest in a read data and a pixel value of judgment reference image data corresponding to the pixel of interest is acquired, and a difference value is calculated with respect to all pixels included in a processing unit for the judgment process, such as an image unit and a page unit. According to this embodiment, the judgment reference image data and read image data are both 6-bit CMYK data, and the differences are acquired with respect to all of CMYK. The calculated difference values are compared with a predetermined threshold value. Whether the printed image has color unevenness or not may be judged based on the comparison result in accordance with the following judgment method. For example, if even one pixel having its difference value higher than the threshold value is included in the pixels included in a processing unit for the judgment process, it is determined that the printed image has color unevenness. Alternatively, if a preset number of or more pixels having their difference values higher than the threshold value, it is determined that the printed image has color unevenness.

One image may be divided into more detail processing units for the judgment process. For example, pixel columns for one raster continuous in the X direction may be defined as a processing unit for the judgment process, if the pixel columns for one raster has even one pixel or a preset number of or more pixels having its or their difference value or values higher than the threshold value, it is judged that the printed image has color unevenness. If pixel columns for one raster includes a continuous preset number of or more pixels having their difference values higher than the threshold value, it may be judged that the printed image has color unevenness. In this way, by performing the judgment process in rasters each including pixels continuous in the X direction, information on a position having color unevenness may be acquired. Thus, in the correction parameter generation processing after the judgment process, the processing load may be reduced by limiting a region where pattern recording and measurement is performed only to a position judged as having color unevenness or a region proximal thereto. Performing the judgment on each of CMYK ink colors allows reproduction of a correction parameter for an ink color judged as causing color unevenness. This may reduce the processing load compared with the case where the pattern recording and measurement is performed for all ink colors.

According to this embodiment, the process for reducing the resolutions of images in the Y direction is performed on read image data and judgment image data. On the other hand, the image resolution reduction process is not performed on images in the X direction from viewpoint of accuracy of color unevenness detection.

A case will be described where the image processing apparatus according to this embodiment detects color unevenness continuous in a conveying direction (illustrated X direction) such as a streak due to a defective discharge of a nozzle of the print head 102 and identifies the nozzle with the defective discharge. In this case, image data may be acquired by reading a pattern for defective discharge detection at a resolution corresponding to an interval exceeding the half of the nozzle interval in the Y direction. For example, if the interval of nozzles in the print head 102 is 1200 nozzles per inch, the image judgment unit 1217 may acquire read image data at a resolution equivalent to 600 nozzles per inch or at a resolution higher than 600 dpi. Judgment reference image data at an image resolution corresponding thereto may be generated from image data for printing in the judgment image data generating unit 1215, and the image judgment unit 1217 may compare it with read image data. This allows easy identification and inspection of each nozzle. From this point of view, in order to detect a defective discharge, both of the read image data and the judgment reference image data may have a resolution equivalent to or higher than the nozzle resolution. If the brightness of the read image corresponding to a specific nozzle is higher than a predetermined value as a result 5 of comparison between the judgment reference image data and the read image data, the image judgment unit 1217 judged that the specific nozzle causes the defective discharge and transmits the judgment result to the CPU 1218. In response thereto, the CPU 1218 may cause a maintenance unit, not illustrated to perform maintenance of a print head and cause a display device to display a content prompting a user to execute such a maintenance.

On the other hand, in detecting a defective discharge, the resolution reduction process may be performed in read image data in the X direction to increase the processing speed.

In order to perform the resolution reduction process in the X direction as described above, image data are stored continuously in the Y direction in the read image data buffer 1214. The data are read out by applying an offset so that the data may be continuous in the X direction, which may increase the speed of the processing and reduce the memory band.

According to this embodiment, a printed image is read by the sensor 105 at a lower resolution (600 dpi) in the Y direction than the nozzle resolution (1200 dpi) and is converted to 300 dpi in the resolution conversion unit 1102 in the image judgment unit 1217. The present invention is not limited thereto. The sensor 105 of this embodiment may include photodiodes at a resolution of 2400 dpi which is higher than the nozzle resolution, and a printed image may be read at a resolution equal to or higher than the nozzle resolution. Then, the resolution reduction process may be performed thereon. The sensor 105 may be configured to read data at a resolution of 300 dpi. In this case, the resolution reduction process in the image judgment unit is not necessary.

As described above, according to this embodiment, judgment reference image data and read data are generated at a resolution lower than a resolution at which nozzles are aligned based on input image data and image data acquired by reading a printed image, and the color unevenness judgment is performed thereon. This configuration may reduce the processing load and the amount of data to be transferred of the judgment processing and increase the speed and therefore may increase the speed of the image judgment of the entire system. The lower reading resolution for reading a printed image with the sensor than the nozzle resolution may allow increase of the reading speed and reduction of the load of processing on the read data. Matching the resolution for the judgment with the correction unit for head shading allows not only judgment of the presence/absence of color unevenness at a resolution visually recognizable by the human eyes but also reduction of the processing load of the correction parameter regeneration performed after the judgment.

Image data of an actual image which is not a dedicated maintenance pattern for judgment of color unevenness and read data of a printed image are used for the color unevenness judgment. Thus, the amount of ink and number of printing mediums for printing the dedicated pattern may be reduced, contributing to reduction of the running cost.

According to this embodiment, the lower resolution in the Y direction where nozzles are aligned than the nozzle resolution allows high speed processing without reducing accuracy of color unevenness detection. A process may further be added for acquiring a resolution lower than the printing resolution in the X direction which is the direction of conveyance of a printing medium, that is, the data resolution for discharging ink dots from nozzles. This allows high speed and highly accurate detection of color unevenness due to a plurality of causes occurring when an image is read.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention may be implemented by executing a program implementing one or more functions of the aforementioned embodiments supplied to a system or an apparatus through a network or a storage medium and read by one or more processors in a computer of the system or apparatus. The present invention may also be implemented by a circuit (such as an ASIC) which implements one or more functions.

By applying this method, color misalignment may be detected based on image data and read image data with a lower processing load. Furthermore, the processing speed may be increased, and the amount of data to be transferred may be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157086, filed Jul. 31, 2014, which is hereby incorporated by reference herein in its entirety.

What is claimed is:

1. An image processing apparatus for inspecting a printed image printed based on image data by using a print head having a plurality of nozzles for discharging ink aligned at first alignment pitches in a first direction and printed on a printing medium conveyed in a second direction intersecting the first direction, the apparatus comprising:
   a generating unit configured to generate, based on the image data, judgment image data used for inspection of the printed image, wherein a resolution of an image corresponding to the judgment image data in the first direction is a second resolution which is lower than a first resolution corresponding to the first alignment pitches; and
   an inspection unit configured to inspect the printed image by comparing read data, which represents an image having a resolution in the first direction equal to the second resolution and is acquired by reading the printed image printed on the printing medium, with the judgment image data.

2. The image processing apparatus according to claim 1, further comprising a correction unit configured to perform a correction process on input image data indicating an image to be printed by using a plurality of correction parameters for reducing color differences between a plurality of regions aligned in the first direction on a printing medium, the plurality of correction parameters are being provided for each processing unit at the second resolution.

3. The image processing apparatus according to claim 2, further comprising a parameter generating unit configured to generate the plurality of correction parameters based on a result of reading of a pattern printed by using the print head.

4. The image processing apparatus according to claim 2, wherein the correction unit performs a correction on the input image data of an image to be printed after the image by using a correction parameter changed based on an inspection result from the inspection unit.

5. The image processing apparatus according to claim 1, wherein
   the print head has a plurality of nozzle arrays corresponding to a plurality of color inks;
   the judgment image data are data including a plurality of elements corresponding to the plurality of color inks;
   the read data are data including R, G, B elements; and
   the inspection unit converts the read data to data including a plurality of elements corresponding to the plurality of color inks and compares the converted read data and the judgment image data to inspect the image.

6. The image processing apparatus according to claim 5, wherein the plurality of color inks includes cyan, magenta, yellow, and black inks, and the judgment image data include cyan, magenta, yellow, and black data.

7. The image processing apparatus according to claim 1, wherein
   the read data are data acquired by reading the image at a reading resolution higher than the second resolution in the first direction; and
   the inspection unit converts the resolution in the first direction of the data acquired by reading the image to the second resolution.

8. The image processing apparatus according to claim 1, wherein the read data are data read at the second resolution in the first direction.

9. The image processing apparatus according to claim 7, further comprising a sensor configured to read the image.

10. The image processing apparatus according to claim 1, further comprising a notification unit configured to notify a user information regarding an inspection result from the inspection unit.

11. The image processing apparatus according to claim 1, further comprising a printing unit configured to print the image by using the print head.

12. The image processing apparatus according to claim 1, wherein the number of gray scale levels of the judgment image data generated by the generating unit is lower than the number of gray scale levels of the input image data.

13. An image processing method for inspecting a printed image printed based on image data by using a print head having a plurality of nozzles for discharging ink aligned at first alignment pitches in a first direction and printed on a printing medium conveyed in a second direction intersecting the first direction, the method comprising:
   generating, based on the image data, judgment image data used for inspection of the printed image, wherein a resolution of an image corresponding to the judgment image data in the first direction is a second resolution which is lower than a first resolution corresponding to the first alignment pitches; and
   inspecting the printed image by comparing read data, which represents an image having a resolution in the first direction equal to the second resolution and is acquired by reading the printed image printed on the printing medium, with the judgment image data.

14. The image processing method according to claim 13, further comprising performing a correction process on input image data indicating an image to be printed by using a plurality of correction parameters for reducing color differences between a plurality of regions aligned in the first direction on a printing medium, the plurality of correction parameters being provided for each processing unit at the second resolution.

15. The image processing method according to claim 14, further comprising generating the plurality of correction parameters based on a result of reading of a pattern printed by using the print head.

16. The image processing method according to claim 14, further comprising performing a correction on the input image data of an image to be printed after the image by using a correction parameter changed based on an inspection result from the inspection unit.

17. The image processing method according to claim 13, wherein the print head has a plurality of nozzle arrays corresponding to a plurality of color inks;
   the judgment image data includes a plurality of elements corresponding to the plurality of color inks;
   the read data includes R, G, B elements; and
   in the inspecting, the read data is converted to data including a plurality of elements corresponding to the plurality of color inks and the converted read data and the judgment image data are compared to inspect the image.

18. The image processing method according to claim 17, wherein the plurality of color inks includes cyan, magenta, yellow, and black inks, and the judgment image data includes cyan, magenta, yellow, and black data.

19. The image processing method according to claim 13, wherein
the read data is acquired by reading the image at a reading resolution higher than the second resolution in the first direction; and
in the inspecting, the resolution in the first direction of the data acquired by reading the image is converted to the second resolution.

20. The image processing method according to claim 13, wherein the read data is read at the second resolution in the first direction.

\* \* \* \* \*